United States Patent Office 2,705,718
Patented Apr. 5, 1955

2,705,718
ANTHRAQUINONE VAT DYESTUFFS

Eduard Moergeli, Neuewelt, near Basel, Switzerland, assignor to Ciba Limited, Basel, Switzerland, a Swiss firm No Drawing. Application December 17, 1951, Serial No. 262,173

Claims priority, application Switzerland July 1, 1948

6 Claims. (Cl. 260—368)

This application is a continuation in part of my application Serial No. 100,298, filed June 20, 1949 (abandoned since the filing of the present application).

The present invention is based on the observation that valuable vat dyestuffs are produced when one molecular proportion of an acylating agent derived from an aromatic dicarboxylic acid is reacted with two molecular proportions of a 1-amino-5-acylaminoanthraquinone, the latter being selected from the group consisting of 1-amino - 5 - (2' - fluorobenzoylamino)-anthraquinone, 1-amino - 5 - (4'-chloro - 2' - fluorobenzoylamino)-anthraquinone and 1-amino - 5 - (5'-chloro - 2' - fluorobenzoylamino)-anthraquinone.

Accordingly the new dyestuffs correspond to the formula

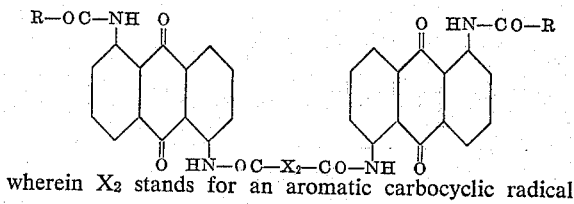

wherein $X_2$ stands for an aromatic carbocyclic radical and each R stands for a member selected from the group consisting of the radicals corresponding to the formulae

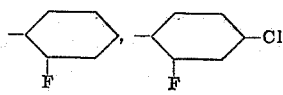

and

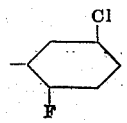

1-amino-5-(4'- or 5'-chloro-2'-fluorobenzoylamino)-anthraquinone can be prepared by monoacylation of 1:5-diaminoanthraquinone. The 2-fluoro-4- or -5-chlorobenzoic acid which are necessary for introducing the corresponding acyl radicals can be made by methods in themselves known. A suitable method for preparing such compounds consists, for example, in diazotizing 1-amino-2-methyl-4- or -5-chlorobenzene with the aid of hydrofluoric acid and sodium nitrite, the appropriate fluorine substitution product being formed either simultaneously with diazotization by the action of the hydrofluoric acid or by subsequent conversion of the diazo compound into the fluorine substitution product with the splitting off of nitrogen. In the resulting 1-fluoro-2-methyl-4- or -5-chlorobenzene the methyl group is either oxidized directly to a carboxylic acid group or converted itno a trichloromethyl group followed by hydrolysis of the latter to a carboxylic acid group.

The 1-amino-5-(2'-fluorobenzoylamino)-anthraquinone or 1-amino-5-(2'-fluoro-4'- or -5'-chlorobenzoylamino)-anthraquinone is acylated with acylating agents derived from aromatic dicarboxylic acids which may contain up to four aromatic six-membered condensed or non condensed rings such as iso- and terephthalic acid, naphthalene-2:6-dicarboxylic acid, diphenyl-4:4'-dicarboxylic acid, or fluoranthene dicarboxylic acid.

In all cases it is of advantage to carry out the acylation with the aid of reactive derivatives of the carboxylic acids in question. The reaction may be conducted in a solvent or dispersing medium, advantageously of high boiling point such as mono-, di- or tri-chlorobenzene, nitrobenzene or naphthalene at a raised temperature, for example, within the range from about 100° C. to the boiling point of the solvent or dispersing medium used.

The products of the invention are valuable vat dyestuffs. They can be used in known manner as such or in the form of their leuco-ester salts obtainable by known methods for dyeing and printing a very wide variety of fibers of animal and especially vegetable character, thus wool and silk, but especially cotton, linen, and artificial silk or staple fibers of regenerated cellulose and also superpolyamide fibers.

The following examples illustrate the invention the parts and percentages being by weight unless otherwise stated and the relationship of parts by weight to parts by volume being the same as that of the kilogram to the liter:

Example 1

6 parts of 1-(ortho-fluorobenzoylamino)-5-amino-anthraquinone and 1.6 parts of isophthalic acid dichloride are heated in 150 parts by volume of trichlorobenzene for ½ hour with stirring to 130–140° C. and then for so long at 190–200° C. that the formation of the dyestuff of the formula

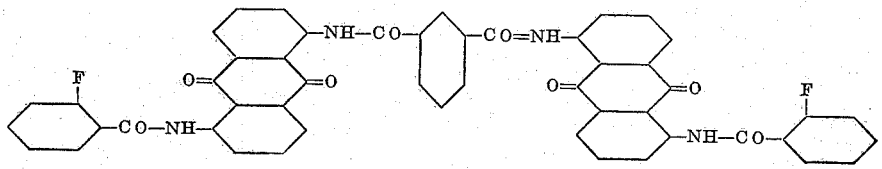

is complete. The dyestuff is then worked up and if necessary subjected to a purification with hypochlorite solution. It dyes the fiber from a Bordeaux colored hydrosulphite vat in pure yellow fast shades and is distinguished in printing also by clarity and strength.

A dyestuff with very similar properties is obtained when instead of isophthalic acid dichloride the same quantity of terephthalic acid dichloride is employed.

The 1-amino - 5 - (ortho-fluorobenzoylamino)-anthraquinone employed can be obtained by partial acylation of 1:5-diamino-anthraquinone with ortho-fluorobenzoyl chloride or from 1-chloro-5-(ortho-fluorobenzoylamino)-anthraquinone by replacement of the chlorine atom by the toluene sulphonamide residue and splitting off of the sulphonic acid residue. It crystallizes from pyridine or nitrobenzene in fine red crystals which melt at 269.5–270° C. (uncorrected).

Example 2

3.27 parts of fluoranthene dicarboxylic acid dichloride of the composition set out in Patent No. 2,299,826, and 7.2 parts of 1-amino-5-(ortho-fluorobenzoylamino)-anthraquinone are stirred for 3 hours at 210° C. in 250 parts by volume of trichlorobenzene. The dyestuff formed is then filtered with suction at 150° C. and worked up in the customary manner. It constitutes a brown yellow powder and dissolves in concentrated sulphuric acid with brown color. For purification 5 parts of dyestuff in fine aqueous suspension are oxidized at 95–100° C. with 20 parts by volume of 13 per cent sodium hypochlorite solution. The purified dyestuff dyes cotton from a Bordeaux colored vat in full yellow shades of very good wet fastness properties.

Example 3

A mixture of 4 parts of 1-amino-5-(2'-fluoro-4'-chlorobenzoylamino)-anthraquinone, 1 part of terephthalic acid dichloride and 150 parts of trichlorobenzene is heated at the boil for 2 hours while stirring. The whole is allowed to cool to 120° C. and the dyestuff of the formula

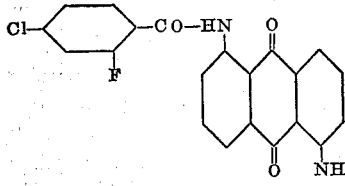

is separated by filtration. It dyes cotton from a Bordeaux colored vat fast pure yellow tints.

When instead of terephthalic acid dichloride an equivalent quantity of acid chloride of the 4-fluorisophthalic acid is used, a dyestuff with similar tinctorial properties is obtained.

The 1-amino-5-(4'-chloro-2'-fluorobenzoylamino)-anthraquinone used (melting point 279° C.) can be made by the partial acylation of 1:5-diaminoanthraquinone with 2-fluoro-4-chlorobenzoyl chloride, or from 1-chloro-5-(4'-chloro-2'-fluorobenzoylamino)-anthraquinone by replacing the chlorine atom by a toluene sulfonamide radical followed by splitting off of the sulfonic acid radical. 1-amino-5-(5'-chloro-2'-fluorobenzoylamino)-anthraquinone (melting point 269° C.) can be made in the same manner.

2-fluoro-4-chlorobenzoyl chloride (boiling at 105–106° C. under 14 mm. pressure) can be made from 2-fluoro-4-chlorobenzoic acid (melting point 205° C.) by reaction with thionyl chloride.

The 2-fluoro-4-chlorobenzoic acid can advantageously be prepared by the oxidation with potassium permanganate of 2-fluoro-4-chlorotoluene (boiling at 158° C. under 743 mm. pressure), which latter can be obtained from 2-amino-4-chloro-toluene by the hydrofluoboric acid method of Balz and Schiemann (Berichte der deutschen Chemischen Gesellschaft, vol. 60, page 1188 (1927)) in excellent yield. In an analogous manner 2-fluoro-5-chlorobenzoyl chloride (boiling at 103–104° C. under 15 mm. pressure) can be obtained from 2-amino-5-chloro-toluene by way of the intermediate products 2-fluoro-5-chloro-toluene (boiling at 156° C. under 741 mm. pressure) and 2-fluoro-5-chlorobenzoic acid (melting at 149–150° C.).

Example 4

A mixture of 0.89 part of diphenyl-4:4'-dicarboxylic acid, 6 parts of thionyl chloride, 0.05 part of pyridine and 90 parts of trichlorobenzene is stirred for 30 minutes at 80° C. and for a further 30 minutes at 120° C., and is then heated at the boil, whereupon thionyl chloride and some of the solvent distil off. The solution is allowed to cool to 100° C., 3 parts of 1-amino-5-(2'-fluoro-4'-chlorobenzoylamino)-anthraquinone are added, and the whole is heated for 2 hours at 200–210° C. After cooling to about 120° C. the dyestuff of the formula

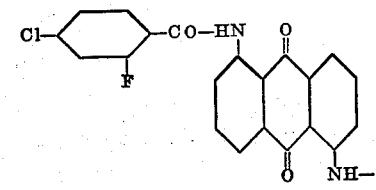

is separated by filtration. It dissolves in concentrated sulfuric acid with an orange red coloration and dyes cotton fast yellow tints.

By methods exactly analogous to those described in the foregoing examples there can be obtained from two molecular proportions of the 1-amino-5-acylaminoanthraquinone given in column I of the following table and 1 molecular proportion of the adjacent dicarboxylic acid in column II, further dyestuffs having the properties given in columns III and IV. The dicarboxylic acid is advantageously used in the form of the dichloride.

| | I<br>Anthraquinone component, 2 mols | II<br>Acid component, 1 mol | III<br>Dyeing on cotton | IV<br>Color of the hydrosulfite vat |
|---|---|---|---|---|
| 1 | 1-amino-5-(2'-fluoro-4'-chlorobenzoylamino)-anthraquinone. | isophthalic acid | pure yellow | Bordeaux red. |
| 2 | 1-amino-4-(2'-fluoro-5'-chlorobenzoylamino)-anthraquinone. | do | do | Do. |
| 3 | do | terephthalic acid | do | reddish blue. |
| 4 | do | diphenyl-4:4'-dicarboxylic acid. | full yellow | Bordeaux. |

Example 5

1 part of the dyestuff obtained according to the first paragraph of Example 1 is vatted at 45° C. in 100 parts of water with addition of 2 parts of sodium hydrosulfite and 4 parts by volume of caustic soda solution of 36° Bé. The stock vat thus obtained is added to a solution of 2 parts of sodium hydrosulfite and 4 parts by volume of caustic soda solution of 36° Bé. in 2000 parts of water. In the dyebath thus obtained 100 parts of cotton are dyed for 1 hour at 40–50° C. with addition of 10 parts of sodium chloride. The cotton is thereupon squeezed out, oxidized in the air, rinsed, acidified, rinsed again and soaped at the boil. It becomes dyed in pure yellow shades.

What is claimed is:
1. An anthraquinone vat dystuff of the formula

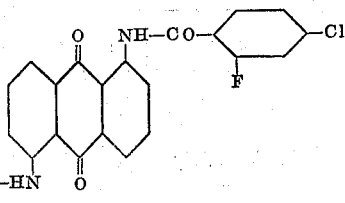

wherein $X_1$ stands for an aromatic carbocyclic radical and R stands for a member selected from the group consisting of the radicals corresponding to the formulae

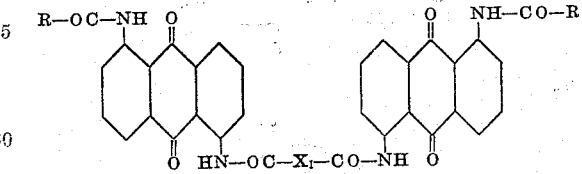

and

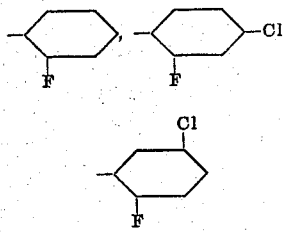

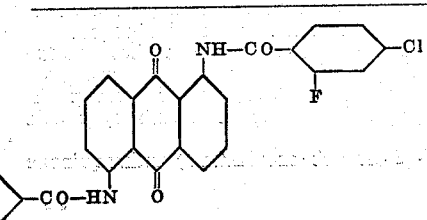

2. An anthraquinone vat dyestuff of the formula

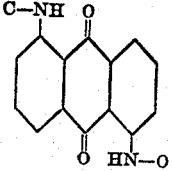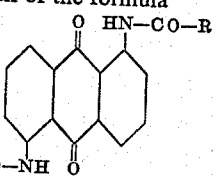

wherein $X_2$ stands for an aromatic carbocyclic radical and each R stands for a member selected from the group consisting of the radicals corresponding to the formulae

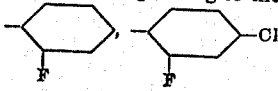

and

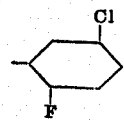

3. An anthraquinone vat dyestuff containing at the most three halogen atoms per anthraquinone radical and corresponding to the formula

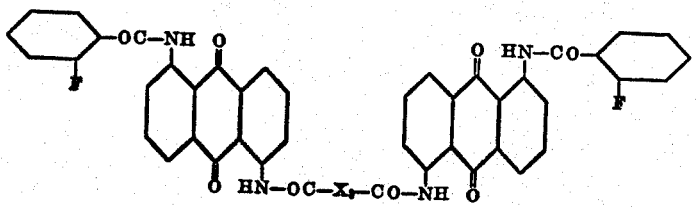

wherein $X_3$ stands for an aromatic carbocyclic radical and the —CO— groups are bound directly to aromatic ring carbon atoms of $X_3$.

4. An anthraquinone vat dyestuff containing at the most three halogen atoms per anthraquinone radical and corresponding to the formula

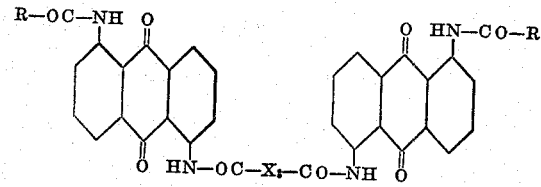

wherein $X_3$ stands for an aromatic carbocyclic radical and the —CO— groups are bound directly to aromatic ring carbon atoms of $X_3$ and R stands for a benzene radical containing in ortho-position to the —CO—group a fluorine atom and as single further substituent a chlorine atom standing in para-position to one of the substituents —CO— and F.

5. The anthraquinone vat dyestuff of the formula

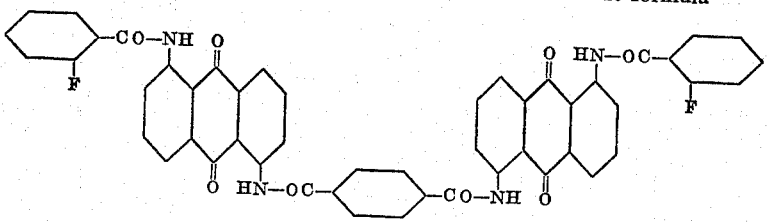

6. The anthraquinone vat dyestuff of the formula

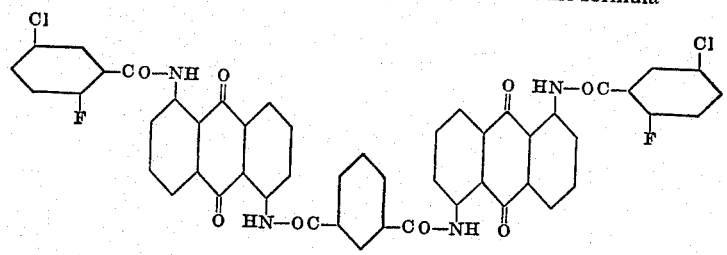

References Cited in the file of this patent

UNITED STATES PATENTS

| | | |
|---|---|---|
| 2,123,375 | Mieg et al. | July 12, 1938 |
| 2,441,512 | Scalera | May 11, 1948 |
| 2,559,667 | Schroeder et al. | July 10, 1951 |

OTHER REFERENCES

Elsevier's Encyclopedia of Organic Chemistry, Series III—Carboisocyclic Condensed Compounds-13-Tricyclic Compounds, pp. 465–466, 1946.